C. F. PIKE.
Steam Engine Packing.
No. 1,715.  Patented Aug. 12, 1840.
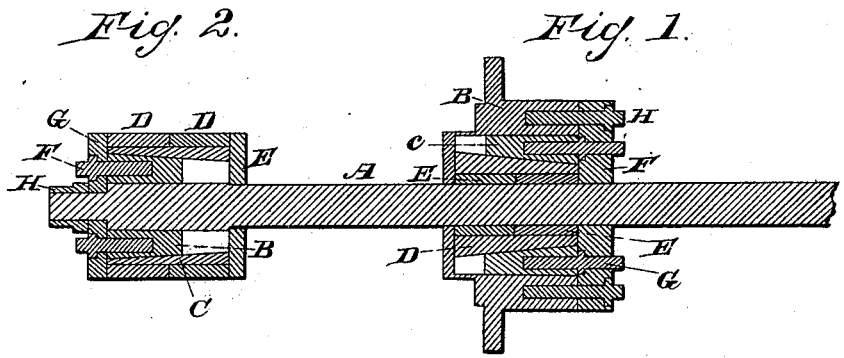
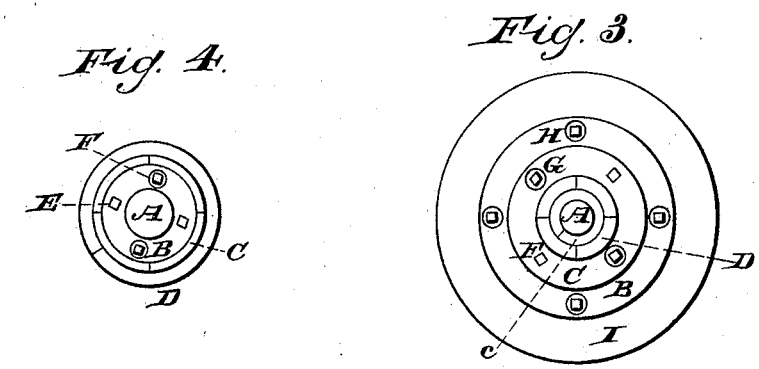
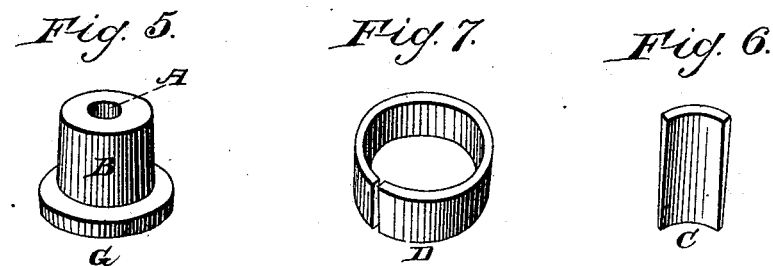

UNITED STATES PATENT OFFICE.

CHARLES F. PIKE, OF PROVIDENCE, RHODE ISLAND.

CONSTRUCTING THE PACKING FOR PISTONS, PISTON-RODS, AND VALVE-STEMS OF STEAM-ENGINES.

Specification of Letters Patent No. 1,715, dated August 12, 1840.

*To all whom it may concern:*

Be it known that I, CHARLES F. PIKE, of the city of Providence, in the county of Providence and State of Rhode Island, have invented a new and Improved Mode of Constructing the Packing for Pistons, Piston-Rods and Valve Stems; and I do hereby declare that the following is a full and exact description of the same.

The nature of my invention consists in the use of cylindrical metallic wedges, within side of metallic rings when used for the packing of pistons, and without side of metallic rings when use for the packing of piston rods or valve stems.

To enable others skilled in the art to make and use my invention, I will proceed to describe its construction and operation.

I construct my packing for steam engines or other pistons by making two rings of cast iron or other metal turned as large as the diameter of the cylinder, and so wide that the rings will just fill the space between the head end and follower of the piston when ground together. I saw said rings open, so that they may expand to fill the cylinder. I make a cylindrical wedge as wide as the two rings aforementioned, the external diameter of which will just admit it, to slide within the aforementioned two rings, when they are placed in the cylinders. The internal diameter of said wedges being conical and as much larger at one end than at the other, as may be deemed necessary, said wedge being cut longitudinally into four or more parts, so that each part may be forced out from the center against the two rings aforementioned. I make another cylindrical wedge in the frustum of a cone, and about seven-tenths as long as the one last named, the external diameter and taper of which corresponds with and fits into the internal diameter of the large end of the other, the thickness of which I make sufficient to admit of screws being tapped into it, to move it longitudinally on the barrel of the piston. To keep said wedge in its place, I put in four or more screws with collars on them, to be let into the follower, two on one side and two on the other. The two with the collars on the inside shove the wedge ahead, and the other two hold it or draw it back. I construct my packing for piston rods, &c., by making two rings of brass or other metal of a diameter that will just admit them on the rod, and so wide as just to fill the space between the bottom or the bushing and the cap when ground together, and of a thickness of about one-eighth of the diameter of the piston rod, which I cut open and place on the rod so as to break joints. I make a cylindrical wedge of a width and internal diameter, corresponding with the width and external diameter of the two rings aforementioned. I make said wedge thicker at one end than at the other, to give it the proper taper, and cut it longitudinally into four or more parts, so that each part may be forced in toward the center against the two rings aforementioned. I make another cylindrical wedge about seven-tenths as wide as the last named, the internal diameter and taper of which corresponds with and fits on the external diameter of the small end of the other. The thick end I make of a proper thickness to admit of four set screws, made in the same manner as described for the piston, the external diameter of which is the same as the internal diameter of the head or stuffing box. I fit on a cap with set screws therein to adjust the last-named wedge, so as to keep the two rings snug to the rod.

In the accompanying drawing, Figures 1, and 2 is a longitudinal section through the axis of the piston rod, the piston, and the cylinder head, with its stuffing box, the cylinder being omitted in the representation. The part marked Fig. 1 is the cylindrical head, with the stuffing box, and the metallic packing contained therein.

B, is the cylinder head. F, the cap, held down by the screws, H, H, in the usual manner.

C, is a conical wedge by means of which the rings are to be made to embrace the piston end.

D, is the intermediate sectional wedge, which is divided into three, four, or more parts, longitudinally.

E, E, are the divided rings, which surround the piston rod.

G, G, are two of the screws which serve to move the conical wedge C.

F², is the piston.

E, E, is the piston head; G, G, the follower; D, D, the divided rings that bear against the cylinder and form the packing.

C, C, are the sectional wedges which are divided longitudinally into three, four, or more parts; which parts when put together, form a cylinder on their outer, and the frustum of a cone on their inner, surface.

B, is the moving conical wedge, which is acted upon by the set screws F, F.

These two set screws, as shown in the drawing, have their collars, or heads, bearing against the exterior of the follower G, G, and serve to draw the wedge B, toward the follower, but there are, between these, two intermediate set screws which have their collars, or heads, bearing against the interior of the follower, and the effect of unscrewing the latter will be to force the wedge B, inward. When this is done, the said wedge will force the wedges C, C, against the interior of the divided rings D, D, and cause them to bear against the cylinder. It will be seen, therefore, that by means of these set screws the metallic packing may be perfectly adjusted without removing the follower.

H, is the nut that holds the follower on to the piston rod. The piston as here represented is adapted to a horizontal cylinder. With a vertical cylinder, the set screws and wedges would be inverted.

It will be seen that the parts constituting the packing apparatus in the piston-head, and in the piston, are in reversed order; the former inclosing the rings around the piston rods, the latter expanding the rings against the cylinder. Fig. 3, is an end view of the piston head, with the cap off; A, the piston rod; B, the cylindrical rim, inclosing the packing, and to which the cap is fastened; C, the rings around the rod; D, the sectional wedge divided into four parts; E, the moving wedge; F, F, the screws that force in the moving wedge; G, G, the screws that draw it back; H, the screws for attaching the cap to the head, and I, the flanch of the head for attaching it to the cylinder. Fig. 4, end view of the piston with the follower off; D, the divided ring, or packing; C, the sectional wedge; B, the moving wedge; E, the screws that advance, and F, those that draw back, the moving wedge. Figs. 5, 6, and 7, show, in perspective, the principal parts that constitute the packing of the piston. In Fig. 5, B, is the conical wedge, which is attached by the set screws to the follower G, A, being the hole through which the piston rod passes. Fig. 6, is one segment of the sectional wedge, the parts of which are to embrace the conical wedge. Fig. 7, is one of the divided rings, which surround, and are forced out by, the sectional wedges.

Having thus fully described the manner in which I construct and arrange the respective parts of my metallic packing, what I claim therein, and desire to secure by Letters Patent, is—

1. The within described manner of packing the piston of a steam engine, by the combined action of the conical wedge, operating upon the sectional wedges, and these upon the divided rings, the conical wedge being adjusted by set screws, and the whole being constructed and operating substantially as set forth.

2. I do not claim the employment of divided rings to constitute the packing of a piston, these having been before used, but under an arrangement of the accessory parts, essentially differing from that employed by me. I also claim the packing of piston rods, and of valve stems, by an arrangement of the respective parts constituting the packing, similar to that employed in the packing of pistons, but situated in a reversed order, the divided rings embracing the piston rods, or valve stems, as above made known.

CHARLES F. PIKE.

Witnesses:
 THOS. P. JONES,
 REUBEN DANIELS.